(12) United States Patent
Muhunthan et al.

(10) Patent No.: US 9,137,325 B2
(45) Date of Patent: Sep. 15, 2015

(54) EFFICIENTLY ISOLATING MALICIOUS DATA REQUESTS

(75) Inventors: Siva Muhunthan, Kirkland, WA (US); Vasile Paraschiv, Redmond, WA (US); Yunxin Wu, Kirkland, WA (US); Lev Novik, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 210 days.

(21) Appl. No.: 13/025,978

(22) Filed: Feb. 11, 2011

(65) Prior Publication Data
US 2012/0210017 A1 Aug. 16, 2012

(51) Int. Cl.
*G06F 15/173* (2006.01)
*H04L 29/08* (2006.01)
*H04L 29/06* (2006.01)

(52) U.S. Cl.
CPC ........ *H04L 67/2819* (2013.01); *H04L 63/1458* (2013.01)

(58) Field of Classification Search
CPC ........................ H04L 67/2819; H04L 63/1458
USPC ........................................................ 709/238
See application file for complete search history.

(56) References Cited

U.S. PATENT DOCUMENTS

| | | | |
|---|---|---|---|
| 7,020,090 B2 * | 3/2006 | Chandwadkar et al. | 370/249 |
| 7,050,555 B2 | 5/2006 | Zargham et al. | |
| 7,469,418 B1 * | 12/2008 | Wilkinson et al. | 726/22 |
| 7,506,360 B1 * | 3/2009 | Wilkinson et al. | 726/3 |
| 2007/0083927 A1 * | 4/2007 | Swaroop | 726/22 |
| 2007/0113284 A1 * | 5/2007 | O'Rourke et al. | 726/23 |
| 2008/0086495 A1 | 4/2008 | Kizitunc et al. | |
| 2010/0027552 A1 | 2/2010 | Hill | |
| 2010/0125903 A1 | 5/2010 | Devarajan et al. | |
| 2011/0153937 A1 * | 6/2011 | Annamalaisami et al. | 711/118 |
| 2014/0317178 A1 * | 10/2014 | Purpura | 709/203 |

FOREIGN PATENT DOCUMENTS

WO    WO 0219661 A2 *    3/2002

OTHER PUBLICATIONS

VISUALSVN Server // Access and Operational Logging, Nov. 9, 2009.*

(Continued)

*Primary Examiner* — Kevin Bates
*Assistant Examiner* — Nazia Naoreen
(74) *Attorney, Agent, or Firm* — Timothy Churna; Sade Fashokun; Micky Minhas

(57) ABSTRACT

Embodiments are directed to efficiently routing data requests from a plurality of tenants and to using smart routing to limit service denials. In an embodiment, a gateway node receives data requests from a tenant subscriber requesting data for an indicated service. The gateway node determines which server node the received data requests are to be routed to. The determination evaluates various criteria associated with the data request. The gateway node queries the determined server node to determine the health of the server nodes and receives a reply from the determined server node indicating the server node's current operating status. The gateway node also, based on the determined server node's reply, routes the received data requests to the determined server node, according to the evaluated criteria.

20 Claims, 4 Drawing Sheets

(56) References Cited

OTHER PUBLICATIONS

The Relational Database of the Azure Services Platform, Pub. Date: Aug. 2009, (4 pages).

Extending SQL Server Reporting Services with SQL CLR Table-Valued Functions, Pub. Date: Mar. 2007, (14 pages).

New Reporting Services Data Providers, Pub. Date: Feb. 28, 2010, (2 pages).

Working with Dundas Charts in SQL Server Reporting Service, Aug. 23, 2010 (24 pages).

Managed Enterprise Colocation Hosting Services, Feb. 20, 2008, (4 pages).

\* cited by examiner

EFFICIENTLY ISOLATING MALICIOUS DATA REQUESTS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications may be designed to interact with other software applications or other computer systems. For example, an internet user may interact with web and database servers while using an internet service. While the user is interacting with the internet service, the user may request that certain portions of data be processed by the service. That data is typically processed and returned to the user without issue. However, in some circumstances, users may (unwittingly or maliciously) send types or quantities of requests that overload the service's ability to handle the requests.

BRIEF SUMMARY

Embodiments described herein are directed to efficiently routing data requests from a plurality of tenants and to using smart routing to limit service denials due to malicious data requests. In one embodiment, a gateway node receives data requests from a tenant subscriber requesting data for an indicated service. The gateway node determines which server node the received data requests are to be routed to. The determination evaluates various criteria associated with the data request. The gateway node then routes the received data requests to the determined server node, based on the evaluated criteria.

In another embodiment, a gateway node receives data requests from a tenant subscriber requesting data for an indicated service. The gateway node determines which server node the received data requests are to be routed to (i.e. which node is best suited to process the request). The determination evaluates various criteria associated with the data request. The gateway node (on its own initiative) queries the determined server node to determine the health of the server nodes and receives a reply from the determined server node indicating the server node's current operating status. The gateway node also, based on the determined server node's reply which indicates the health of the server nodes, routes the received data requests to the determined server node, according to the evaluated criteria. The gateway node uses the health of the server nodes to make future routing decisions, including whether to allow or prevent the request in the case of a malicious attack.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
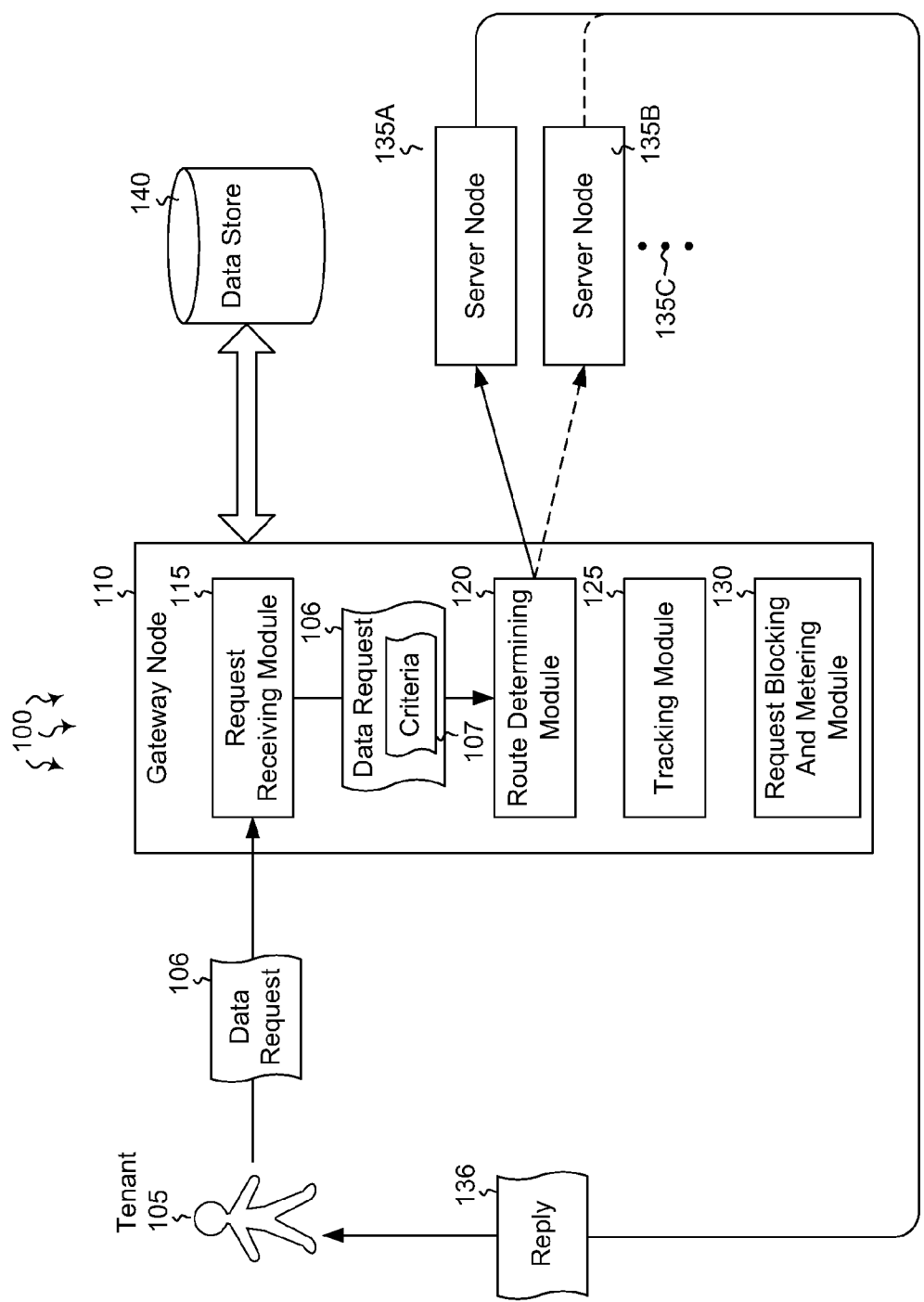
FIG. 1 illustrates a computer architecture in which embodiments of the present invention may operate including efficiently routing data requests from a plurality of tenants and using smart routing to limit service denials.

Embodiments described herein are directed to efficiently routing data requests from a plurality of tenants and to using smart routing to limit service denials. In one embodiment, a gateway node receives data requests from a tenant subscriber requesting data for an indicated service. The gateway node determines which server node the received data requests are to be routed to. The determination evaluates various criteria associated with the data request. The gateway node then routes the received data requests to the determined server node, based on the evaluated criteria.

In another embodiment, a gateway node receives data requests from a tenant subscriber requesting data for an indicated service. The gateway node determines which server node the received data requests are to be routed to. The determination evaluates various criteria associated with the data request. The gateway node queries the determined server node to determine the health of the server nodes and receives a reply from the determined server node indicating the server node's current operating status. The gateway node also, based on the determined server node's reply, routes the received data requests to the determined server node, according to the evaluated criteria.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/ or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry data or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks (e.g. cloud computing, cloud services and the like). In a distributed system environment, program modules may be located in both local and remote memory storage devices.

FIG. 1 illustrates a computer architecture 100 in which the principles of the present invention may be employed. Computer architecture 100 includes gateway node 110. Gateway node 110 may be any type of computer system including a local, distributed or other computer system. The gateway node may include various different modules which may be used to perform different functions. For example, request receiving module 115 may be used to receive data requests 106 from different users. In some embodiments, tenant 105 may send a data request to the gateway node where it is then processed by one or more of the gateway node's modules. As used herein, the terms tenant, or tenant subscriber may refer to a user or group of users that are linked to a single subscription. For instance, a tenant may subscribe to certain services, or may be allowed a certain number of data requests. Each user associated with that tenant (or subscription) would be able to access the services and/or data to which the tenant is subscribed. Each tenant may have substantially any number of users; accordingly, references to a tenant herein may include references to the tenant's users.

In some cases, prior to receiving the data request at the gateway node, the data request may be load-balanced by a hardware-based load balancer. Thus, in cases where large numbers of tenants are sending data requests, these data requests may be load-balanced over multiple different gateway nodes. Upon receiving the data request (either directly from the tenant or from a load balancer), the request receiving module 115 may forward the data request to the route determining module 120. The route determining module may use various information or criteria 107 related to the data request to determine where the request should be routed. The data request may be routed to any of a plurality of different server nodes 135A, 135B or 135C (note that the ellipses indicate that many more server nodes may be available to process the data request).

The criteria 107 or other properties associated with the data request may be used by the route determining module to determine where the request is to be routed. The criteria may include an indication of which tenant sent the request, what service or data the request is requesting, information about the tenant's subscription, which server node processed that tenant's data requests in the past, or other information associated with the data request. The route determining module may also be configured to query the server nodes to determine the server nodes' health status (i.e. the nodes' current processing status including available processor time, available memory, processing queue and other information). Based on the server nodes' health status and the other criteria, the route determining module can make an intelligent decision regarding which server node the data request is to be routed to.

Other modules of gateway node 110 may be used to perform various different functions. For instance, the tracking module 125 may be configured to track each data request that is received and who the request was received from. The tracking module may further keep track of which tenants are performing suspicious activities, such as sending multiple simultaneous (or rapidly sequential) data requests. Requests of this type may indicate that the user is attempting a denial of service attack. Other suspect activity may also be tracked by the tracking module. In cases where the gateway node has determined that a user is behaving in a suspicious manner, request blocking and metering module 130 may either limit (meter) the tenant's data requests, or may block them entirely. These and other concepts will be explained in greater detail below with regard to methods 200 and 300 of FIGS. 2 and 3, respectively.

Figure 2:
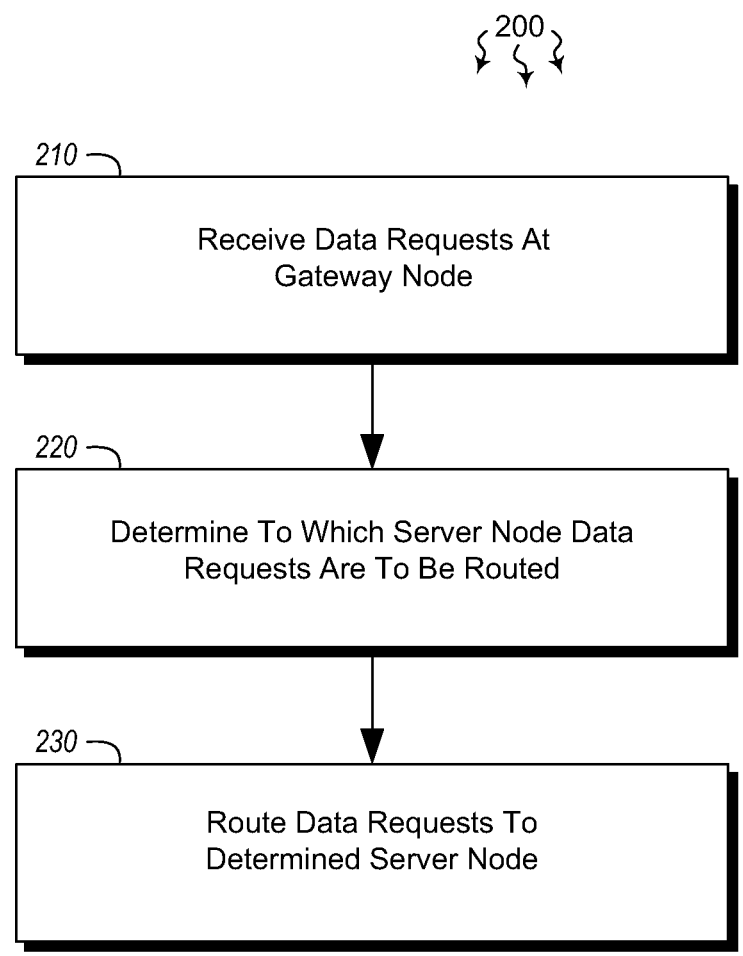
FIG. 2 illustrates a flowchart of an example method for efficiently routing data requests from a plurality of tenants.
Figure 3:
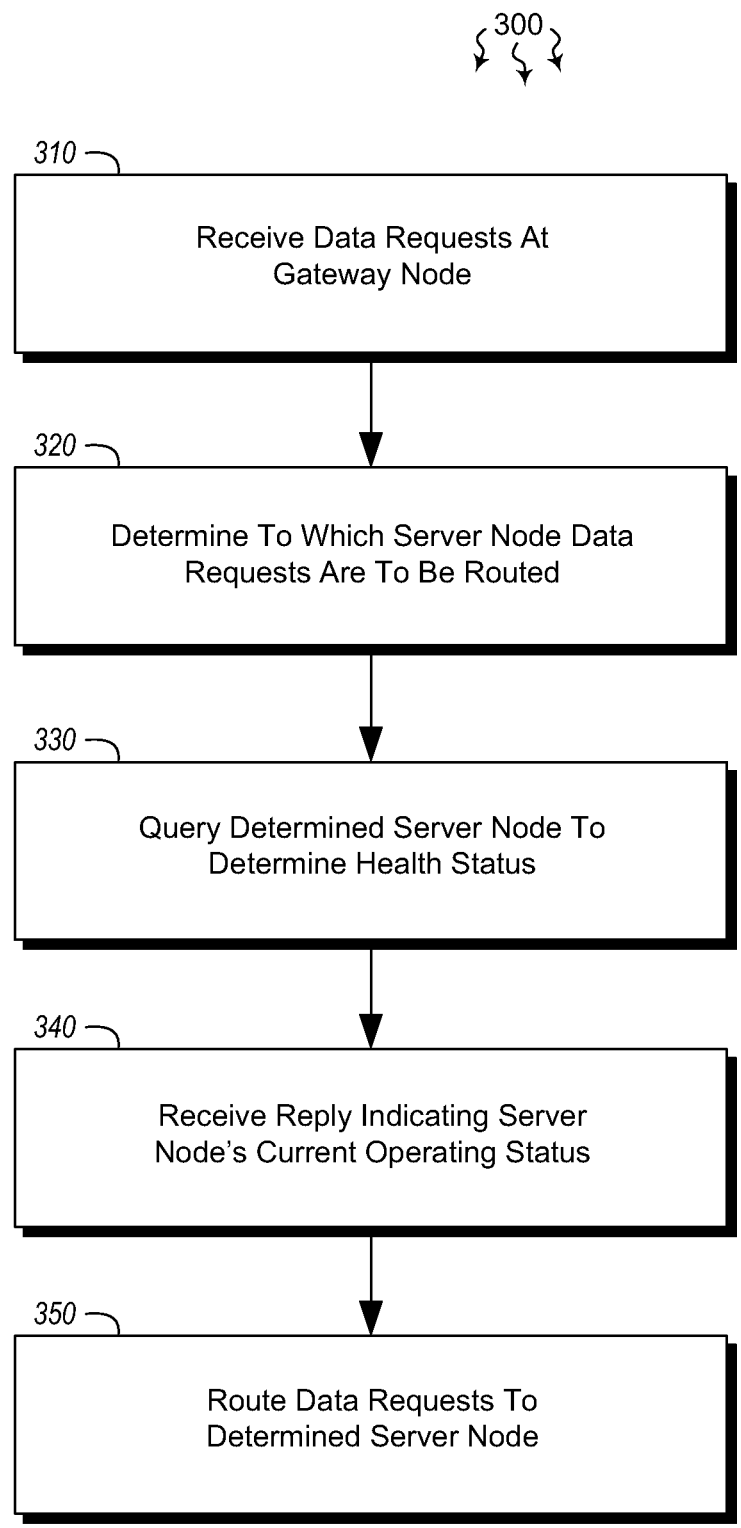
FIG. 3 illustrates a flowchart of an example method for using smart routing to limit service denials.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for efficiently routing data requests from a plurality of tenants. The method 200 will now be described with frequent reference to the components and data of environment 100.

Method 200 includes an act of receiving at a gateway node one or more data requests from a tenant subscriber requesting data for an indicated service (act 210). For example, request receiving module 115 at gateway node 110 may receive data request 106 from tenant subscriber 105 requesting data for an indicated service. For example, the tenant may be requesting access to a service provided by the server nodes (e.g. 135A). In some cases, the service may comprise a reporting service. The reporting service may be configured to gather data and prepare reports using the gathered data. In such cases, the data request may include a request to retrieve data stored in data store 140 and to compile it into a report, which is then returned to the user (e.g. reply 136).

In some embodiments, each tenant may be provided an isolated workload. Accordingly, each tenant is allotted a certain number or percentage of the available server nodes and/or server node processing time. As such, because each tenant is guaranteed at least a certain number of server nodes or at least a certain amount of processing time, one tenant's workload cannot exceed another tenant's workload boundaries. Thus, even if one tenant is barraging the gateway node 110 with requests, only the allotted number of server nodes or allotted amount of processing time will be given to that tenant's requests. The other tenants using the server nodes will be able to continue using their allotted portions without being affected by the other users. The amount of processing time or processing nodes may be customizable and/or dynamically adjustable. Thus, if a tenant pays (or otherwise opts) for more processing capability, the tenant's workload can be increased by the amount paid for on the fly.

As mentioned above, in some cases, the data requests may be filtered before being received at the gateway node. The data requests may be received at a hardware-based load balancer, and subsequently load balanced. Thus, in cases where multiple gateway nodes are being used, the data requests received from the various different tenants may be spread out over the different gateway nodes to ease the burden of any one particular gateway node.

Method 200 includes an act of the gateway node determining which server node the received data requests are to be routed to, wherein the determination evaluates one or more criteria associated with the data request (act 220). For example, route determining module 120 of gateway node 110 may determine which server node (e.g. 135A-135C) the received data request 106 is to be routed to. The determination may take into account various criteria 107 and other properties related to the data request and/or the tenant requesting the data.

For example, one of the criteria upon which the routing determination is made may include request type. Thus, certain request types may be routed to server nodes that are optimally suited to process those data request types. Accordingly, for example, if the request is a report request, the route determining module may be configured to route all or a portion of report requests to a server node (e.g. 135B) which is optimally suite to handle report requests. It will be understood by one skilled in the art that this is just one example of data request type, and that any data request type may be used. In some cases, groups of server nodes may be optimally suited to handle a certain type of data request. Accordingly, in such cases, the data request may be routed to the group of server nodes.

Other criteria on which the routing determination may be made may include requests received from a given tenant. In this case, data requests received from that tenant are routed to server nodes that are optimally suited to process data requests from that tenant. Still other criteria may include previous requests processed at a given server node. In this case, similar data requests that were previously processed by a particular server node are routed to that server node. When the data requests are routed to the server node where similar nodes were previously processed, that server node may use cached data to speed up the processing time.

As mentioned above, tracking module 125 may track any one or more of the following: which tenants are sending data requests, what services the data requests are for, which data requests have been sent in the past and which data requests have been the source of a problem. For instance, in tracking the above, the tracking module may be configured to notice when particular tenants are sending too many requests, are sending too many requests for a particular service or data item, or were making requests when a server node went down. Thus, if a server node went down, the tracking module may note each tenant that was requesting data at the time, and add a count to their subscription indicating that on at least one occasion, they were sending data requests to a server node that went down. If that tenant is later sending data requests to another server node that goes down, that tenants count may be further incremented. If a tenant's count is incremented a certain number of times (possibly within a specified time period), that tenant will be labeled as suspect. Depending on the severity, that tenant's data may be limited or blocked entirely by module 130.

Thus, each tenant's account may be associated with a count or other tallying system which indicates how suspect or suspicious that tenant is. If the tenant has a high count, that tenant is likely attempting malicious attacks. In this manner, the gateway node tests for malicious attacks received from the various different tenant subscribers. Once the gateway node determines that a tenant is attempting a malicious attack (or is simply requesting a task that would take an inordinate amount of resources to complete), that tenant's requests may be metered or blocked.

The gateway node 110 may be further configured to query one or more of the server nodes (135A-C) to determine the health of the server nodes. In response to the query, the server node may indicate its current central processing unit (CPU) use, memory use, network use and other processing capabilities, as well as any work queues indicating how much work the server node already has lined up. The gateway node may use this health information alone, or in addition to the data request criteria in determining which server node a particular data request is to be routed to. In some cases, the health data may cause the gateway node to override the decision made after evaluating the data request criteria. Thus, if the route determining module 120 determines that a particular data request is to be routed to server node 135A, but server node 135A's health status indicates that it does not currently have the ability to handle data requests, the server node's health status may override the prior decision, and the data request will be routed to another (healthier) server node.

Method 200 includes an act of the gateway node routing the received data requests to the determined server node, based on the evaluated criteria (act 230). For example, route determining module 120 may route data request 106 to the determined serve node (e.g. 135A), based on the evaluated criteria. In this manner, incoming data requests may be smartly routed to the server nodes that are best able to process the data request, and not merely load-balanced based on current processing capacity. In some cases, the route determining module may add custom headers to the data requests to send the data requests to the determined server node. The custom headers may indicate where the data request is to be routed, and may also include different message properties including which tenant sent the request.

Figure 4:
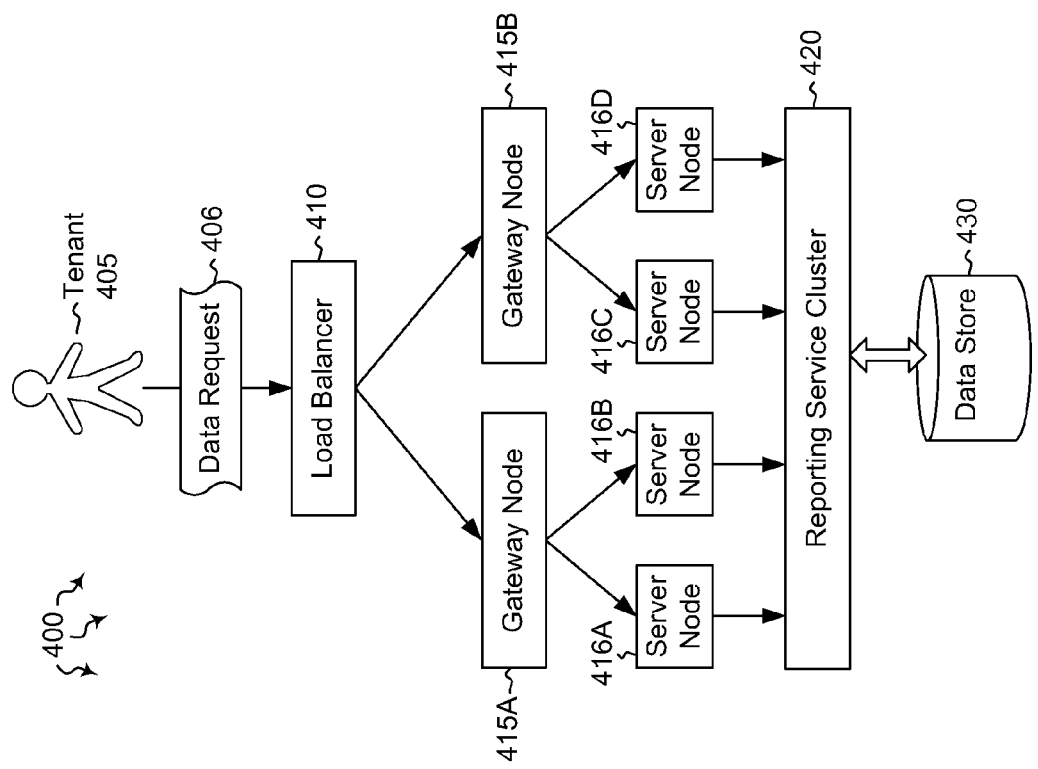
FIG. 4 illustrates a computer architecture in which smart routing may be used to avoid service denials.

FIG. 3 illustrates a flowchart of a method 300 for using smart routing to limit service denials. The method 300 will now be described with frequent reference to the components and data of environment 400 of FIG. 4.

Method 300 includes an act of receiving at a gateway node one or more data requests from a tenant subscriber requesting data for an indicated service (act 310). For example, gateway node 415A may receive data request 406 from tenant subscriber 405 requesting data for an indicated service. The data request may first be received by hardware-based load balancer 410. The load balancer may balance the incoming data requests and spread the requests over the various gateway nodes (in FIG. 4, only two gateway nodes are shown (415A and 415B); however, substantially any number of gateway nodes may be used). The load balancer may distribute the data requests over the gateway nodes, depending on how many are currently available for use.

Method 300 includes an act of the gateway node determining which server node the received data requests are to be routed to, wherein the determination evaluates one or more criteria associated with the data request (act 320). For example, gateway node 415A may determine which server node (e.g. 416A-D) the data request 406 is to be routed to. The gateway node may use various different criteria in its determination including what type of data request was received, what service or data the request was for, what tenant sent the request, and whether that tenant has sent similar requests in the past. Any one or more of these or other criteria may be evaluated to determine which server node(s) would be optimally able to process the data request.

Method 300 includes an act of the gateway node querying the determined server node to determine the health of the server nodes (act 330). For example, gateway node 415A may query the determined server node (along with any other server nodes the gateway node wishes to query) to determine its current processing health. The processing health may include an indication of current and forecasted processing capacity. The queried server nodes may respond each with their individual current health status (act 340). In some cases, if the gateway node determines that the server node's reply indicates that the server node is overloaded, the gateway node will log which tenant subscriber's requests the server node was processing. If a certain tenant subscriber is associated with multiple overloaded server nodes, the gateway node will limit or block the number of requests received from that tenant. The tenant is also added to a suspect list for a specified amount of time. If that specified amount of time expires with no further events, the tenant will be removed from the suspect list.

The degree to which each tenant subscriber on the suspect list is suspected of causing a server node overload is weighted over a period of time. If a tenant's count is repeatedly incremented, that tenant is blacklisted, and all requests from that tenant are blocked (alternatively, the blacklisted tenant may simply be unsubscribed). If the tenant's count is incremented a specified number of times (this amount may be configurable, or predetermined), the tenant may be placed on a suspect list, where the tenant's data requests may be limited in number and/or size. Tenants on the suspect list may only be able to access a limited subset of server nodes, or may only be able to use a certain percentage of their normally allotted processing time. A tenant whose count has not been incremented (or has not been incremented for a certain amount of time) is placed on a good list indicating that the tenant is in a good state, and is not suspected of performing any malicious activities. Tenants on the good list may be allowed to use the server nodes with the lowest available restrictions.

Method 300 also includes, based on the determined server node's reply, an act of the gateway node routing the received data requests to the determined server node, according to the evaluated criteria (act 350). For example, gateway node 415A may route the data request 406 to the determined server node (e.g. 416A) based on the evaluated criteria and/or the health status of the intended server node. If the server node is overloaded, the tenant's request may be passed to another server node, or may be blocked if the tenant is determined to be attacking the system. During processing at the server node, the requested data may be retried from the data store 430 by the reporting service cluster 420. Accordingly, in cases where the data request is a request for a reporting service, the reporting service cluster may be used in conjunction with the server nodes and data store to fully respond to the tenant's request.

Accordingly, methods, systems and computer program products are provided which efficiently route data requests from multiple different tenants to a server node that is optimally able to process the tenant's request. Moreover, methods, systems and computer program products are provided which use smart routing to limit service denials at any given server node.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including at least one processor and a memory, in a computer networking environment including a plurality of computing systems, a computer-implemented method for using smart routing to limit service denials, the method comprising:

tracking, at a tracking module of a gateway node, a tally corresponding to each of a plurality tenants, each tally tracking a level of suspicion of the corresponding tenant's use a plurality of server nodes serviced by the gateway node, including:

each time that a server of the plurality of server nodes goes down, updating the corresponding tally for each tenant that was requesting data from said server node when said server node went down, including updating a particular tally for a particular tenant at least one time in connection with a server node going down; and each time that a server of the plurality of server nodes is determined to be overloaded, updating the corresponding tally for each tenant that was requesting data from said server node when said server node was determined to be overloaded, including updating the particular tally for the particular tenant at least one time in connection with a server node being overloaded;

receiving, at a receiving module of the gateway node, one or more data requests from the particular tenant, the one or more data requests requesting data for an indicated service provided by the plurality of server nodes; and determining, at a route determining module of the gateway node, how to process the received one or more data requests from the particular tenant, including:

based at least on the particular tally for the particular tenant being within a first range, determining that the particular tenant is on a malicious list, and blocking the one or more data requests;

based at least on the particular tally for the particular tenant being within a second range, determining that the particular tenant is on a suspect list, and metering the one or more data requests; and based at least on the particular tally for the particular tenant being within a third range, determining that the particular tenant is on a good list, and permitting the one or more data requests with a lowest available level of restriction.

2. The method of claim 1, wherein the gateway node tracks at least one of the following: which tenants are sending data requests, what services the data requests are for, and which data requests have been sent in the past.

3. The method of claim 1, wherein each tenant is provided an isolated workload associated with a percentage of the available server nodes, such that one tenant's workload does not exceed another tenant's workload boundaries.

4. The method of claim 3, wherein each tenant's workload is customizable and dynamically adjustable.

5. The method of claim 1, wherein the data requests are received at the gateway node after having been load-balanced at a hardware-based load balancer.

6. The method of claim 1, wherein the gateway node routes data requests for certain request types to server nodes that are designated to process those data request types.

7. The method of claim 1, wherein the gateway node routes data requests received from the particular tenant to server nodes that are designated to process data requests from the particular tenant.

8. The method of claim 1, wherein the gateway node routes subsequent data requests from the particular tenant to a particular server node that processed previous data requests from the particular tenant, and wherein the particular server node includes at least a portion of cached data used in processing the previous data requests.

9. The method of claim 1, wherein the gateway node logs tenant subscribers that are linked to a malicious attack.

10. The method of claim 1, further comprising adding one or more custom headers to the received data requests to send the data requests to a determined server node.

11. The method of claim 1, further comprising the gateway node querying one or more server nodes to determine the health of the server nodes, wherein the health of the server nodes is based on the current processing status of the server nodes, the current processing status comprising available processor time, available memory and a processing queue.

12. The method of claim 1, wherein each tenant subscriber is allotted an isolated workload associated with a certain number of server nodes for processing the tenant subscriber's data requests.

13. The method claim 1, wherein each tenant's tally is weighted over a period of time.

14. The method of claim 1, wherein the particular tally for the particular tenant is within the first range and the particular tenant is determined to be on the malicious list, and wherein the route determining module blocks the one or more data requests.

15. The method of claim 1, wherein the particular tally for the particular tenant is within the second range and the particular tenant is determined to be on the suspect list, and wherein the route determining module meters the one or more data requests.

16. The method of claim 1, wherein the particular tally for the particular tenant is within the third range and the particular tenant is determined to be on the good list, and wherein the route determining module permits the one or more data requests with the lowest available level of restriction.

17. A computer program product comprising one or more hardware storage device having stored thereon computer-executable instructions that, when executed by one or more processors of a computing system, cause the computing system to use smart routing to limit service denials, including at least the following:

tracking, at a tracking module of a gateway node, a tally corresponding to each of a plurality tenants, each tally tracking a level of suspicion of the corresponding tenant's use a plurality of server nodes serviced by the gateway node, including:

each time that a server of the plurality of server nodes goes down, updating the corresponding tally for each tenant that was requesting data from said server node when said server node went down, including updating a particular tally for a particular tenant at least one time in connection with a server node going down; and each time that a server of the plurality of server nodes is determined to be overloaded, updating the corresponding tally for each tenant that was requesting data from said server node when said server node was determined to be overloaded, including updating the particular tally for the particular tenant at least one time in connection with a server node being overloaded;

receiving, at a receiving module of the gateway node one or more data requests from the particular tenant, the one or more data requests requesting data for an indicated service provided by the plurality of server nodes; and determining, at a route determining module of the gateway node, how to process the received one or more data requests from the particular tenant, including:

based at least on the particular tally for the particular tenant being within a first range, determining that the particular tenant is on a malicious list, and blocking the one or more data requests;

based at least on the particular tally for the particular tenant being within a second range, determining that the particular tenant is on a suspect list, and metering the one or more data requests; and based at least on the particular tally for the particular tenant being within a third range, determining that the particular tenant is on a good list, and permitting the one or more data requests with a lowest available level of restriction.

18. The computer program product of claim 17, wherein each tenant's tally is weighted over a period of time.

19. A computer system comprising the following:
one or more processors;
system memory;
one or more computer-readable storage media having stored thereon computer-executable instructions that, when executed by the one or more processors, causes the computing system to use smart routing to limit service denials, including at least the following:
tracking, at a tracking module of a gateway node, a tally corresponding to each of a plurality tenants, each tally tracking a level of suspicion of the corresponding tenant's use a plurality of server nodes serviced by the gateway node, including:
each time that a server of the plurality of server nodes goes down, updating the corresponding tally for each tenant that was requesting data from said server node when said server node went down, including updating a particular tally for a particular tenant at least one time in connection with a server node going down; and
each time that a server of the plurality of server nodes is determined to be overloaded, updating the corresponding tally for each tenant that was requesting data from said server node when said server node was determined to be overloaded, including updating the particular tally for the particular tenant at least one time in connection with a server node being overloaded;
receiving, at a receiving module of the gateway node, one or more data requests from the particular tenant, the one or more data requests requesting data for an indicated service provided by the plurality of server nodes; and
determining, at a route determining module of the gateway node, how to process the received one or more data requests from the particular tenant, including:
based at least on the particular tally for the particular tenant being within a first range, determining that the particular tenant is on a malicious list, and blocking the one or more data requests;
based at least on the particular tally for the particular tenant being within a second range, determining that the particular tenant is on a suspect list, and metering the one or more data requests; and
based at least on the particular tally for the particular tenant being within a third range, determining that the particular tenant is on a good list, and permitting the one or more data requests with a lowest available level of restriction.

20. The computer system of claim 19, wherein the gateway node tracks at least one of the following: which tenants are sending data requests, what services the data requests are for, and which data requests have been sent in the past.

* * * * *